United States Patent [19]

Metrier

[11] 4,003,480
[45] Jan. 18, 1977

[54] APPARATUS FOR LOADING SHIPS OR BARGES

[76] Inventor: Michel Metrier, 20, Parc de Bearn, Saint Cloud, France, 92210

[22] Filed: Dec. 23, 1975

[21] Appl. No.: 643,924

[30] Foreign Application Priority Data

Dec. 24, 1974 France .............................. 74.42669

[52] U.S. Cl. .................................. 214/14; 212/14; 212/18
[51] Int. Cl.² ........................................ B65G 67/58
[58] Field of Search ........... 214/12, 14, 13; 212/11, 212/14, 18, 22

[56] References Cited

UNITED STATES PATENTS 2,946,466  7/1960  Weiner ................................. 214/14

FOREIGN PATENTS OR APPLICATIONS 1,524,139  4/1968  France ................................ 214/14

*Primary Examiner*—Robert J. Spar
*Assistant Examiner*—George F. Abraham
*Attorney, Agent, or Firm*—Laurence & Neilan

[57] ABSTRACT

Apparatus for unloading floating cargo vessels comprising endless pick-up members mounted on a jib which, in turn, is mounted on a gantry; a sensing member for determining the position in height of the cargo in the vessel relative to a fixed reference plane; and a control member responsive to information received from the sensing member for controlling the angular positioning of the jib, thereby controlling the position in height of the pick-up members.

3 Claims, 6 Drawing Figures

APPARATUS FOR LOADING SHIPS OR BARGES

The present invention relates to an apparatus for handling solid bulk matter, and particularly pulverulent products, unloaded from a ship or barge.

This unloading raises specific problems in connection with the difficulty in positioning an endless pick-up apparatus, whether it be a bucket wheel, bucket chain or the like, exactly with respect to the pick-up plane, particularly to the lower layer of the matter disposed in the holds.

In fact, the vessels are located on the one hand on a stretch of water of which the level may vary, this applying to both river and, to a greater extent, to sea-ports; continuous changes in position may occur during an unloading operation, due to the movements of the tide; in the second place, the marine of fluvial cargo vessel becomes lighter as it is unloaded and it therefore rises with respect to the water level.

It is an object of the invention to overcome the drawbacks occasioned by such movement, and to this end, the invention relates to an apparatus for unloading floating cargo vessels, of the type constituted by endless pick-up members such as bucket chains or wheels, mounted on the end of a jib articulated on a gantry, the whole comprising means for outwardly evacuating the bulk material unloaded from the floating vessel by the pick-up members, said installation comprising in addition a sensor member for determining the position in height of the floating vessel, in the course of unloading, with respect to a fixed reference plane, a control member permanently receiving the information received from the sensor member concerning the position in height of the vessel during unloading, the control member being able to be informed, by manual action of the operator, as to the characteristic data of the vessel and particularly the depth of hold thereof, this control member being able to integrate these data in order to control the angular positioning of the jib supporting the endless pick-up member, according to a determined programme.

The invention will be more readily understood on reading the following description with reference to the accompanying drawings, in which.

Figure 1:
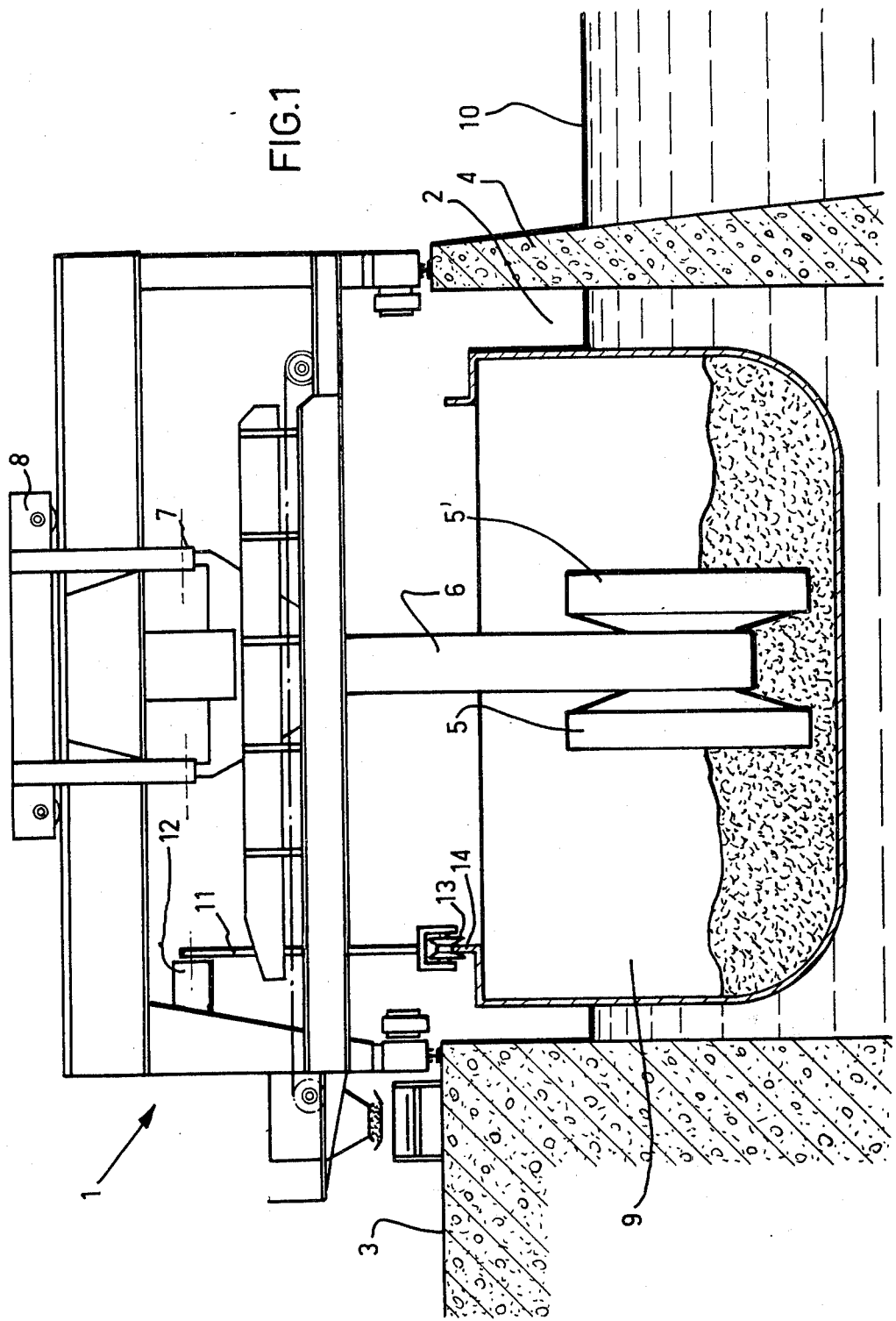
FIG. 1 is a transverse section through an unloading installation comprising the apparatus according to the invention
Figure 2:
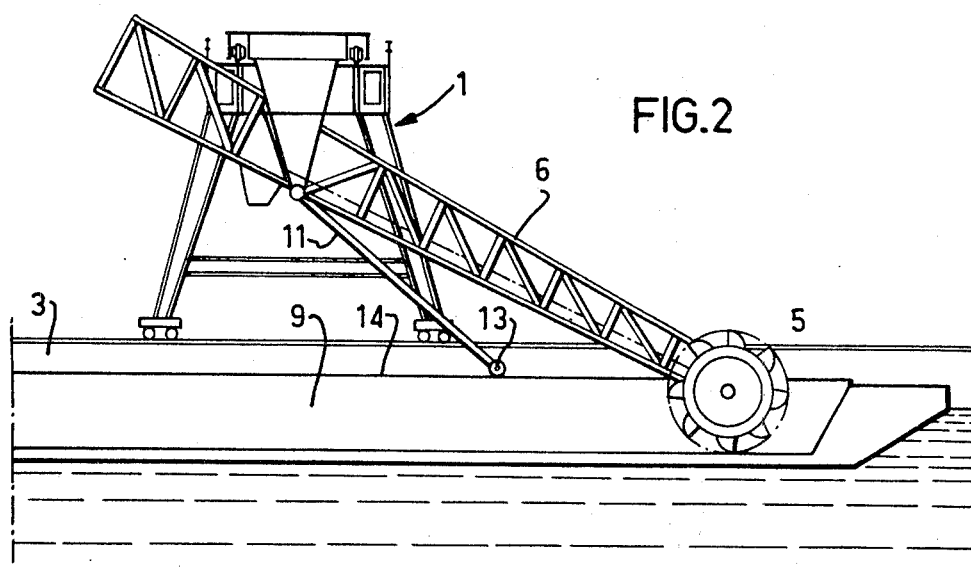
FIG. 2 is a side elevational view of this installation.
Figure 4:
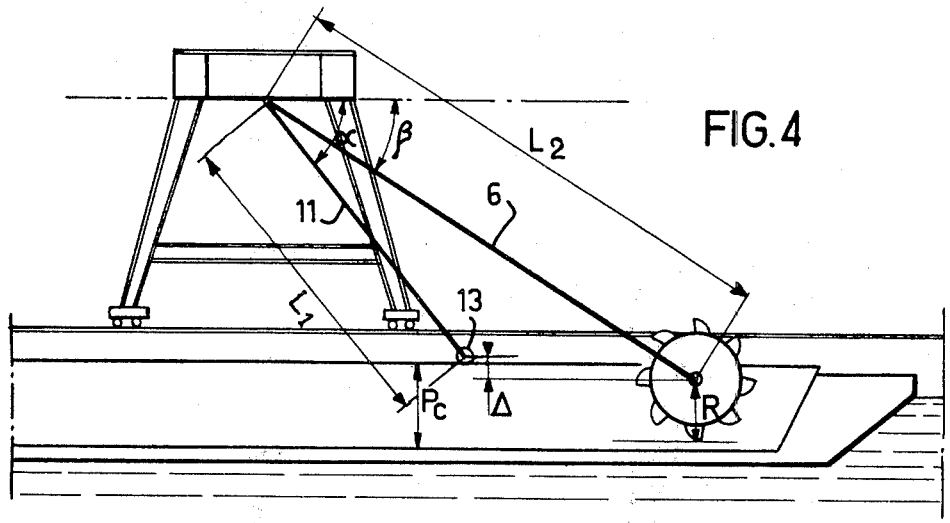
FIG. 4 is a functional diagram of the installation shown in side elevation and corresponding to the view of FIG. 2.
Figure 5:
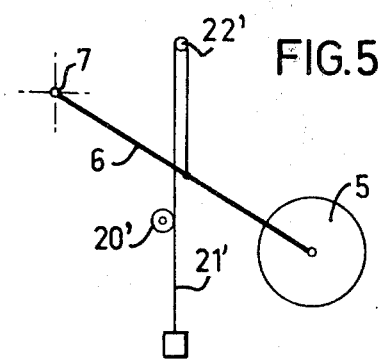
Figure 6:
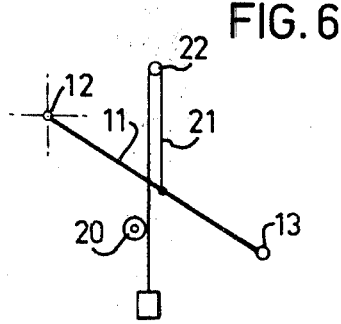

FIGS. 5 and 6 respectively show views of the angular adjustment of the jib (FIG. 5) as a function of the angular position of the sensor (FIG. 6).

Referring now to the drawings, the installation is constituted by a gantry 1 astride a wet dock or berth 2, one side resting on a quay 3 and the other side on a support 4; the gantry 1 is mounted to roll longitudinally along the wet dock 2; in this way, it may pass along the whole unloading area; it comprises a pick-up apparatus constituted by twin bucket wheels 5, 5' mounted at the end of a jib 6 articulated at 7 on the gantry.

The jib may be displaced in known manner transversely along the gantry by the crab 8 and it may thus successively sweep all the volume constituted by the floating vessel 9 in position of unloading in the wet dock 2.

The height of the water 10 may of course change and in addition the vessel will rise as it is unloaded.

According to the invention, to ensure the correct positioning of the bucket wheels 5 and 5' with respect to the volume to be unloaded, a sensor member has been provided which is constituted here by a rod 11 articulated at 12 on a fixed point of the gantry; the sensor rod 11, articulated at its upper end on the gantry, rests by its lower end on a flat or linear structure running parallel to the bottom of the vessel; to this end, the lower end of the rod may be provided with a grooved pulley 13 running on the upper edge of the coaming 14.

The angular position of the rod 11 with respect to a horizontal reference plane enables the height of the vessel with respect to this reference plane to be determined at any moment.

To guide the bucket wheel with respect to the bottom of the vessel, the height $\Delta$ must therefore be constant, whatever the position of the ship or barge. This height $\Delta$ is determined by the following equation:

$$\Delta = PC - (R-r)$$

Where
R is the radius of the bucket wheel
r is the radius of the pulley 13 of the sensor
PC is the depth of the hold.

From a reference position, which may be horizontal axis corresponding to the pivot of the jib bearing the bucket wheel, a device counts, as the arm of the sensor pivots away from the reference position, a certain number of signals which are produced by a metering disc of which the angle of rotation is multiplied by a mechanical system with respect to the angle of pivoting of the sensor arm.

The metering permits to calculate the angel $\alpha$ of the sensor compared with its original position, and the control member determines from the value of this angel $\alpha$ the angle $\beta$ which the jib bearing the bucket wheel must take.

The angle $\beta$ is determined by the equation: $\Delta = L_2 \sin \beta - L_1 \sin \alpha$.

If $L_2 = L_1 = L$, then: $\Delta/L = (\sin \beta - \sin \alpha)$

The depth of hold value PC has been displayed at the control desk, at the beginning of the operation.

The system for lifting the jib bearing the bucket wheel is therefore set into motion as soon as the value $\beta$ is not in correspondence with the value $\alpha$ measured, and thus corrects the height $\Delta$ which regulates the depth of cut of the bucket wheels in the material contained in the vessel.

According to the variant embodiment shown in FIGS. 5 and 6, the angular displacement of the sensor on the one hand (FIG. 6) and of the jib on the other hand (FIG. 5) is determined by the rotation of the rotary meter 20, 20' driven by the displacement of the strap 21, 21' after passage over a return pulley 22, 22'.

The angular displacement of the sensor rod 11 may be detected by any suitable relay: electromechanical relays may in particular be used, by displacement of a slide over studs, or electromagnetic means, by displacement of a magnetized mass in front of a succession of flexible leaf switches or electronic means (detection probe or the like).

Similarly, the sensor member may be replaced by a linear-slide device, for example by a telescopic rod whose base abuts on the edge of the coaming and which rises or falls as a function of the position in height of the floating vessel.

In this way, the device enables barges for example whose hold depth is different to be unloaded by a simple display of a value PC corresponding to the barge in question without any other modification, the control device automatically adapting itself.

Concerning the variations in width of the hold, it is sufficient to adapt, for each type of admissible vessel, end -of-course series limiting the traverse of the crab bearing the jib installed on the gantry. The same applies for the variations in length of the hold.

Figure 3:
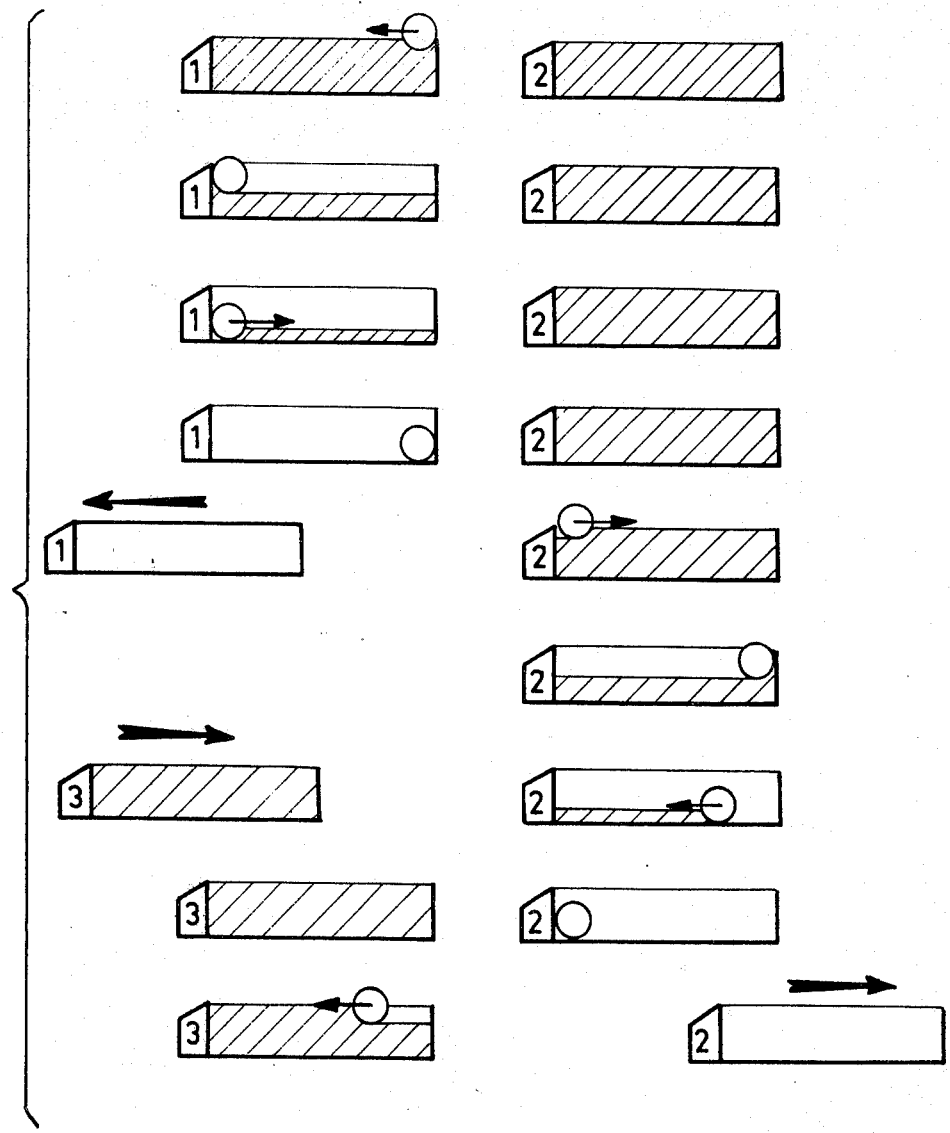
FIG. 3 is a schematic view of the changing of the cargo vessels at a multiple unloading station equipped according to the invention.

A particular efficient and advantageous unloading installation may therefore be produced, whose yield is considerably improved with respect to the prior known devices; in particular, the advantages of the invention will enable an unlaoding installation to be produced whereby two barges may be placed one behind the other and unloaded successively without interruption; when the first barge is empty, it may be evacuated and a third, full barge may come into position, whilst the pick-up device then works on the second barge; this is illustrated in FIG. 3 which shows the successive phases of an unloading operation at a double station.

The new equipment according to the invention avoids any lost time between the successive unloading layers and moreover, any time lost in positioning the sensor device is approaching.

In addition, whatever the depths of industrial holds an even number of layers may be removed.

The programme between the unloading of two vessels may therefore be established as shown in FIG. 3; a rapid succession may be ensured without complicating the apparatus and whilst conserving the usual speeds. A yield of about 95% may be obtained on two barges or more, which is a considerable improvement in yield with respect to the preceding ones.

What I claim is:

1. An apparatus for unloading marine or fluvial transport cargo vessels, of the type constituted by endless pick-up means, such as bucket wheels, a gantry, a jib articulated on said gantry and supporting the pick-up means for outwardly evacuating the bulk material unloaded from the floating vessel by the pick-up means, wherein said apparatus comprises:
   driving means adapted to move the gantry along the vessel so as to unload successively the whole length of the vessel;
   a sensor member mounted on the gantry for determining the position in height of the vessel in the course of unloading with respect to the gantry;
   gantry control means permanently the information from said sensor member concerning the position in height of the vessel during unloading;
   manually operable means adapted to inform said gantry control means as to the characteristic data of the vessel such as the depth of hold thereof;
   said gantry control means being able to integrate these data, according to a determined program, in order to control the angular positioning of the jib which supports the endless pick-up means, thereby making it possible to cut into the surface of the material to be unloaded;
   said sensor member being constituted by a rod articulated at a first end thereof on the gantry as to be angularly movable with respect to the gantry, said rod being displaceable with the gantry with respect to the vessel, the second end of said rod resting freely by gravity on a ledge of the vessel, said rod following substantially the same direction with respect to the jib and being of such a length as to rest on said edge of the vessel substantially along the length of the vessel where said pick-up means are in operation.

2. An apparatus as claimed in claim 1, wherein said sensor member terminates in a pulley allowing said second end of said rod to slide with respect to the coaming of the floating vessel.

3. An apparatus as claimed in claim 1, wherein said second end of said sensor rod bears on a plane of the floating vessel located parallel to the bottom of the hold thereof.

* * * * *